April 21, 1964     W. F. POYNER     3,129,465
MACHINES OR APPARATUS FOR THE INJECTION
MOULDING OF PLASTIC MATERIAL
Filed Dec. 21, 1961     3 Sheets-Sheet 1

April 21, 1964     W. F. POYNER     3,129,465
MACHINES OR APPARATUS FOR THE INJECTION
MOULDING OF PLASTIC MATERIAL
Filed Dec. 21, 1961     3 Sheets-Sheet 2

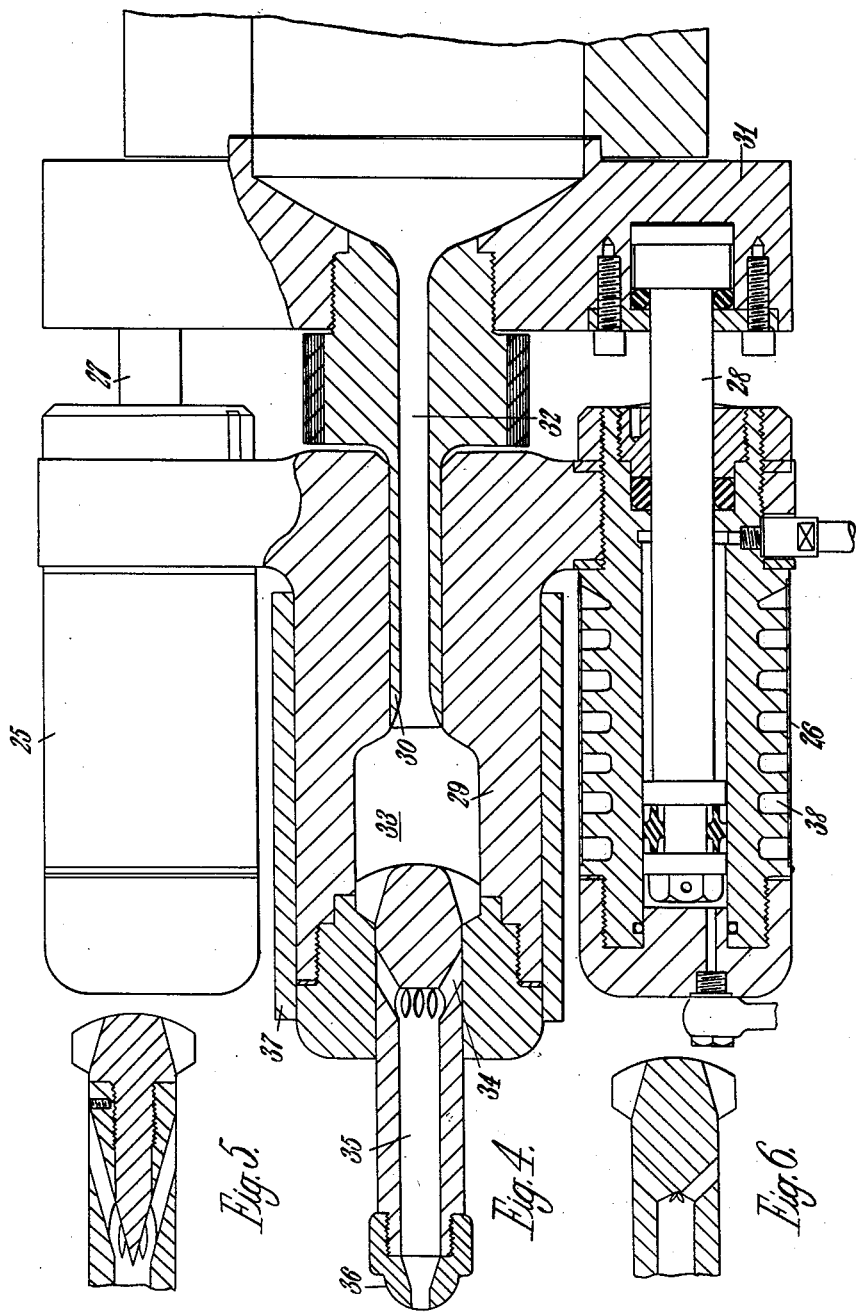

United States Patent Office

3,129,465
Patented Apr. 21, 1964

3,129,465
MACHINES OR APPARATUS FOR THE INJECTION MOULDING OF PLASTIC MATERIAL
William Francis Poyner, Blackburn, England, assignor to Foster, Yates & Thom Limited, Blackburn, England
Filed Dec. 21, 1961, Ser. No. 160,988
5 Claims. (Cl. 18—30)

This invention relates to machines or apparatus for the injection moulding of plastic material of the kind in which the material in molten, liquid, or semi-liquid form is forced into a closed mould through an injection nozzle which is maintained in tight sealing engagement with the inlet orifice of the sprue or mould during the filling of the latter, the nozzle being associated with a chamber or cylinder provided with a feed screw or other means for feeding the plastic material. For the successive filling of a series of moulds with such apparatus it is necessary to provide for relative movement between the feed chamber or cylinder and the mould. This can be effected by reciprocating either the feed cylinder and nozzle or the mould, or by a combination of both movements, but such arrangements involving reciprocating motions of relatively heavy machine parts are cumbersome and expensive. It is accordingly the main object of the present invention to provide an improved injection moulding machine or apparatus in which this disadvantage is obviated.

According to the invention the injection nozzle of an injection moulding machine or apparatus of the kind described is formed as or constitutes part of a telescopic structure interposed between the feed chamber or cylinder and the mould or mould support, and means is provided for extending and contracting said telescopic structure to bring the nozzle into sealing engagement with the mould orifice and to withdraw the nozzle from the mould as required.

According to a further feature of the invention the telescopic sructure includes valve means which is opened automatically when the nozzle is displaced by engagement with a mould inlet orifice. Preferably said valve means is associated with a displaceable nozzle part and is held closed under the pressure of the plastic material until there is relative displacement between the nozzle part and the sleeve.

The means for extending and contracting the telescopic nozzle structure preferably comprises one or more fluid operable piston or ram devices, e.g. hydraulic rams.

The invention also consists in an arrangement according to any of the preceding three paragraphs including fluid pressure means for expanding the telescopic structure, in which the relatively slidable parts of said telescopic structure are so arranged and proportioned that rearward movement of one or more of said parts takes place when the pressure of plastic material in the mould exceeds a predetermined maximum and the arrangement acts as a pressure limiting means.

The invention also consists in an arrangement according to any of the preceding four paragraphs, in which the relatively slidable parts of the telescopic structure are arranged and operated so that relative displacement of said parts is employed to assist injection of material by piston action. Thus in one convenient arrangement, after the nozzle has been engaged with the mould, one of the parts of the telescopic structure is displaced forwardly to reduce the chamber volume enclosed by the parts and thereby to assist, or to effect, injection of material into the mould. The structure thus serves as a reservoir of plastic from which injection can be effected.

In a convenient construction according to the invention the telescopic nozzle structure referred to previously is mounted on the end of the feed or forcing cylinder for injection moulding which may be of conventional construction. The telescopic structure comprises a fixed tubular part secured to said cylinder, a reciprocatory part slidable upon the fixed tubular part, and a nozzle part slidable within the outer end of the sleeve part. The bore of the nozzle part preferably has lateral inlet passages arranged to co-operate with a counterbore in the sleeve part so as to act as a valve.

According to a further feature of the invention the telescopic nozzle structure is provided with heating means to maintain the mobility of the plastic material within it.

Other features of the invention will be understood from the following example.

The invention will be more completely understood from the following detailed description which is given in conjunction with the accompanying drawings, in which:

FIGURE 4 is a sectional side view of a modified form of telescopic nozzle structure and FIGURES 5 and 6 are sectional side views of two modified forms of injection nozzle.

Figure 1:
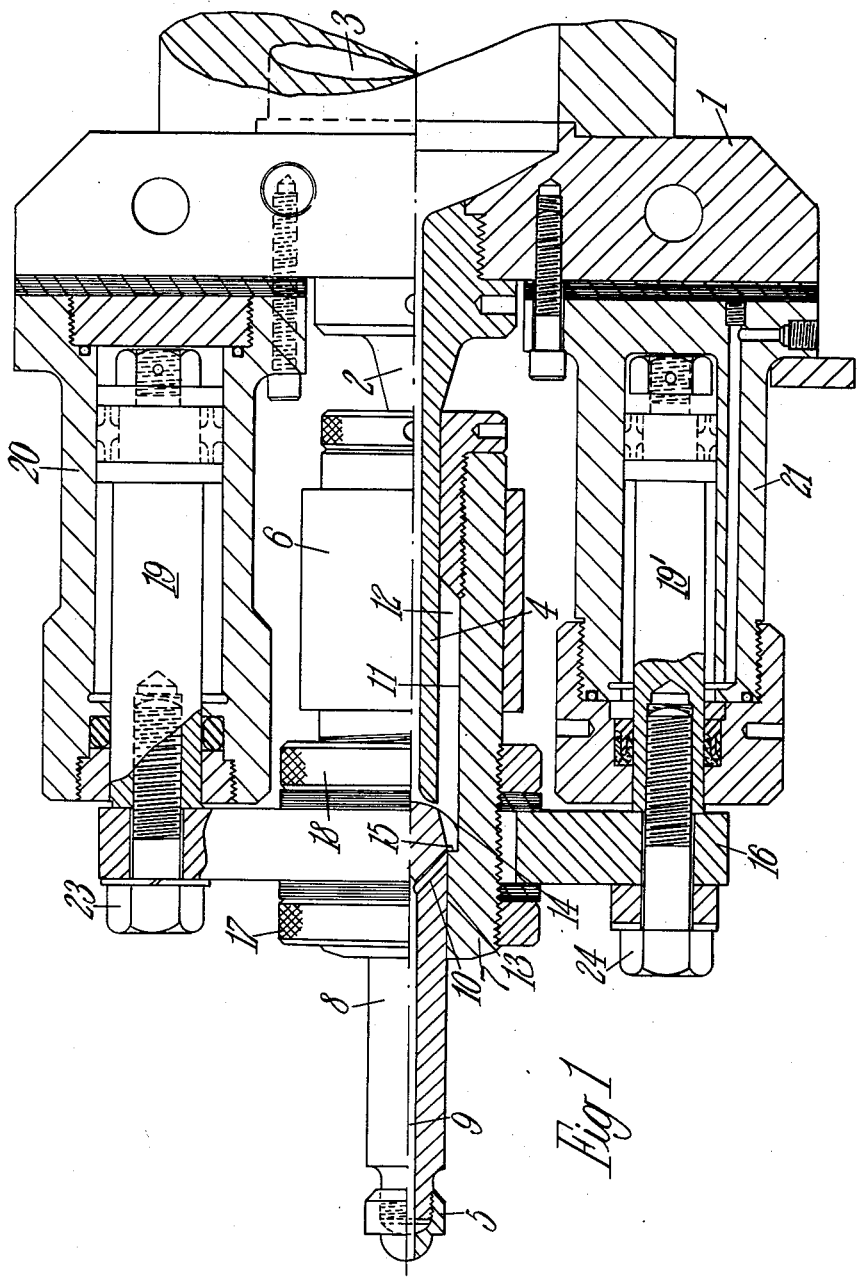
FIGURES 1 and 2 are sectional side and end views respectively of a telescopic nozzle structure constructed in accordance with the invention.
Figure 2:
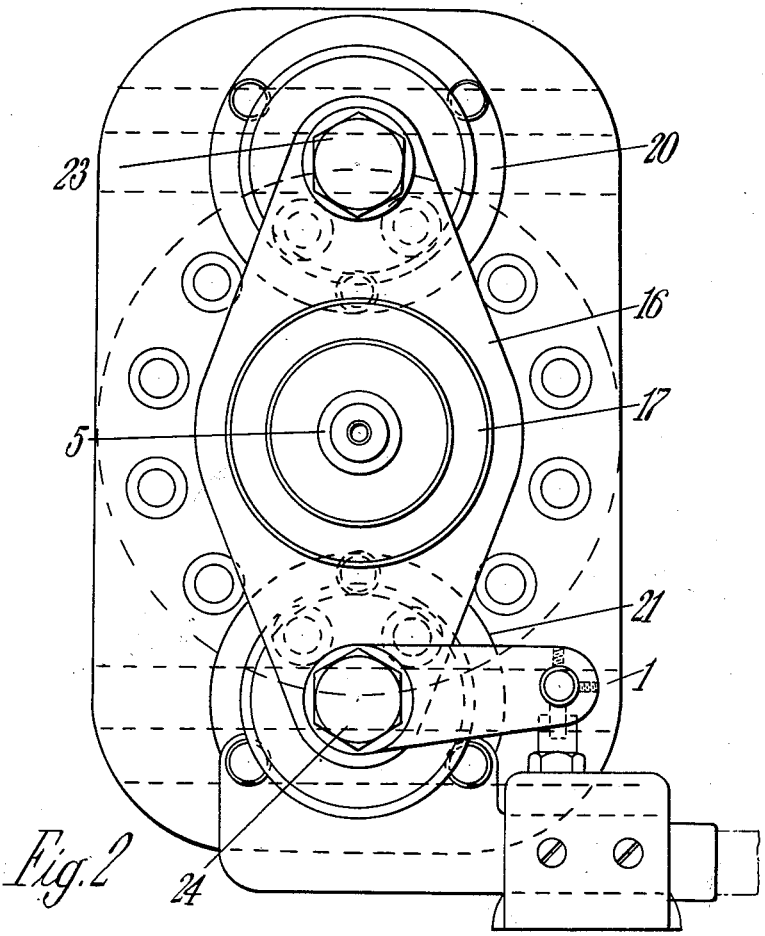
Figure 3:
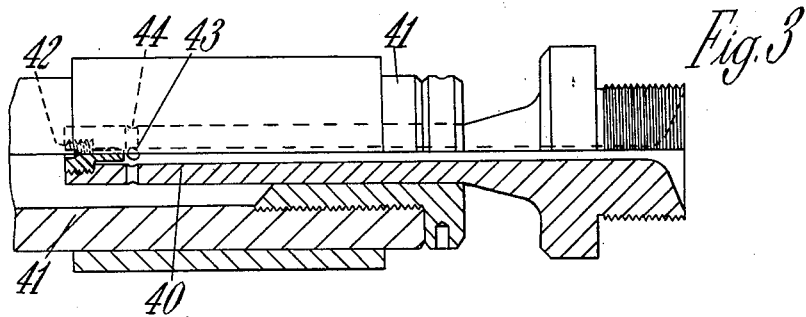
FIGURE 3 is a sectional side view of a modified form of central stem for use in place of that shown in FIGURE 1.

Referring first to FIGURES 1, 2 and 3 of these drawings, the telescopic nozzle structure shown is intended for use with an injection or forcing head of the kind which includes a horizontal cylinder having therein a rotatable screw for feeding plastic material supplied to the cylinder which latter is provided with the usual heating means for maintaining the material in liquid or semi-liquid condition. The cylinder is mounted on a fixed base structure and to its forward end there is attached a transverse block or plate 1 extending diametrally outwardly and having a central tapering aperture 2 the larger end of which coincides with the cylinder bore 3 and the smaller end of which lies within the block and is continued outwardly in the form of a sleeve 4 to form a circular bore. Secured within the said bore is a tubular telescopic structure having at its outer end an injection nozzle 5 formed to have sealing engagement with a recessed orifice in a mould. The telescopic structure comprises a fixed inner part formed by the said sleeve 4, an intermediate sleeve part 7 slidable thereon, and a nozzle part 8 slidable within and extending outwardly beyond the outer end of the sleeve part 7. The fixed inner part 4 is of circular cross section having a bore extending from end to end, the rear end thereof having an outwardly tapered inlet which coincides with the outer end of the tapered bore 2 in the block. The bore 11 of the sleeve part 7 is reduced at its rear end, e.g. by the insertion of a packing sleeve, so that in the rearmost position of the sleeve part the larger bore of the latter affords an annular space 12 surrounding the outer end of the fixed part 4. The bore of the forward end of the sleeve part 7 is also reduced in diameter as shown at 13, but to a less extent than the rear part aforesaid, and the nozzle part 8 is slidably mounted therein. The rear or inner end of the nozzle bore 9 is branched to a lateral opening or openings 10 lying in the outer cylindrical surface of the nozzle towards the rear end thereof. The nozzle passage is thereby closed when said lateral opening lies within the reduced forward bore 13 of the sleeve part 7, but will be opened if the nozzle is displaced rearwardly in the sleeve part to bring said opening or openings 10 within the enlarged central bore 11 of said sleeve part. The inner end of the nozzle part 8 also has an external flange or collar 14 slidable in the larger diameter bore 11 of the sleeve but arranged to abut against a shoulder 15 formed by the reduced forward sleeve part to prevent the nozzle being forced out of the sleeve. The said collar 14 may be longitudinally grooved and/or may have a lesser diameter than the sleeve bore so as to permit plastic material to pass through or over the collar.

A transverse actuating plate 16 is secured to the forward end of the sleeve part 7 by means of clamping rings 17 and 18, and the ends of this plate are secured respectively by bolts 23, 24 to two hydraulic rams 19 and 20 operating in cylinders 21 and 22 mounted on the transverse block or plate 1 carried by the feed or forcing cylinder. The rams 19, 20 and their cylinders 21, 22 lie on opposite sides of and parallel to the telescopic nozzle structure. By operation of the rams 19, 20 the sleeve part 7 of the nozzle structure can be drawn back rearwardly over the fixed part 4 thereof and also extended outwardly therefrom.

A carrier structure for a number of moulds is mounted on a fixed base adjacent or near to the above described injection or forcing head and conveniently includes a rotary table or other displaceable mould carrier arranged to bring the inlet orifices of successive moulds into alignment with the injection nozzle 5 so that by extending the telescopic nozzle structure the nozzle can be brought into engagement with the mould orifice. The arrangement is such that when the sleeve part 7 is retracted, the outer end of the bore of the fixed tubular part 4 opens into the intermediate large diameter section 11 of the sleeve part 7 which will be filled with plastic material under pressure from the feed cylinder. This pressure forces the nozzle 5 forwardly until its rear flange or collar 14 engages the sleeve shoulder 15, in which position the nozzle inlet passage or passages 10 lie within the reduced forward bore 13 of the sleeve so that the material cannot pass through the nozzle. In order to fill a mould which has been approximately positioned by the mould carrier, the hydraulic rams 19 and 20 are actuated to advance the sleeve part 7 of the telescopic structure until the nozzle 5 engages the mould orifice, this movement being continued until the nozzle part has been forced relatively rearwardly into the sleeve part 7 to bring the inlet ends of the nozzle passage 10 branch or branches into the intermediate large diameter section 11 of the sleeve part 7, the mould being then filled in the ordinary manner. When filling is completed, the sleeve part 7 of the telescopic structure is withdrawn by the rams. This results in the automatic closure of the valve means under the pressure of plastic material within the sleeve and permits an empty mould to be brought into position for filling. In order to ensure that the plastic material within the telescopic structure is maintained in a sufficiently mobile condition, the sleeve part 7 thereof is provided with an annular heater 6 which may be of any desired form.

The telescopic structure may also be arranged to act as a pressure limiting device during mould filling by arranging the fluid pressure piston or ram devices so that these will be displaced rearwardly by a predetermined pressure within the structure. In a convenient construction, the main feed screw or other forcing device in the chamber or cylinder is controlled by a switch. Fluid pressure actuates the piston or ram devices 19 and 20 forwardly to bring the nozzle part 5 into engagement with the mould. This forward movement starts up the feed screw or its equivalent. As the sleeve part 7 is displaced forwardly over the fixed tubular part 4 there is formed a cavity having a cross-sectional area equal to that of the fixed tubular part 4. After the nozzle part 5 has engaged the mould, the sleeve part 7 continues its forward travel and the cavity will be reduced in volume by an amount dependent upon the relative cross-sectional areas of the nozzle part 5 and fixed tubular part 4. If it should be desired, this reduction in volume could be equal to the increase in volume referred to above. When the mould is filled the pressure therein builds up and this pressure is reflected back to the interior of the sleeve part 7, exerting forces on the nozzle part 5 and on the fixed tubular part 4 dependent on their respective cross-sectional areas. The internal pressure also acts on the rear internal shoulder 15 of the sleeve, tending to force the latter rearwardly against the pistons or rams. When the force thus created exceeds that afforded by the pistons or rams the sleeve part 7 moves rearwardly, thereby closing the nozzle valve and stopping injection into the mould. A limit switch is provided so as to be actuated by the aforesaid rearward movement of the sleeve part to control the hydraulic circuit so as to continue (if necessary after a time delay) the rearward movement of the sleeve part 7 and to displace the nozzle 5 away from the mould. It will be seen that during the initial rearward movement of the sleeve part 7 the volume of the internal cavity increases, but after the sleeve part has engaged the collar 14 of the nozzle part this volume decreases. It may be arranged, if desired, that the final volume equals that afforded before retraction of the pistons or rams.

It will be appreciated that by suitable proportioning of the parts of the telescopic structure, this can act as a reservoir or accumulator of plastic material and that injection can be aided, or if desired effected, by piston action of the sleeve part. Thus in a possible arrangement, after the nozzle has been engaged with the mould and its valve is open, further forward movement of the pistons or rams can effect a further forward displacement of the sleeve part so that its rear internal shoulder acts as a piston to inject material from the internal cavity into the mould. Thus by dimensioning the parts so that the volume thus injected is sufficient to fill the mould cavity, the whole injection can be effected by forward displacement of the sleeve part over the fixed tubular part, in which case a valve means may be provided in the fixed tube to prevent back flow into the injection cylinder or chamber and thereby enable higher injection to be achieved.

It will also be appreciated that by suitably modifying the parts of the telescopic structure, the device may be used for high pressure shot injection. A suitable modification by which this may be achieved is shown in FIGURE 3 in which the fixed tubular part 4 of FIGURE 1 is replaced by a stem 40 through which plastic material is supplied from the injection head and on which the sleeve part 41 of the telescopic structure slides. This stem is plugged at its forward end by a screw-plug 42, the plastic material being fed into the space between the stem 40 and the sleeve 41 through one or more apertures 43 leading into an annular groove 44 formed in the wall of the stem 40.

In the modification shown in FIGURE 4 the general construction and operation of the telescopic nozzle structure is similar to that hereinbefore described, but the hydraulic cylinders 25 and 26, which take the place of the rams 19 and 20 of FIGURE 1, are slidably mounted on fixed pistons 27 and 28 and are secured at their rear ends to the rear part of the sleeve 29 which slides on the fixed tubular part 30 which extends forwardly from the transverse block or plate 31 and contains a central bore 32 which communicates with the bore of the injection or forcing head and opens at its forward end into the enlarged space 33 in the sleeve 29 which communicates with the inlet passages 34 leading to the bore 35 of the nozzle 36 when the sleeve 29 moves forward under the action of the hydraulic cylinders 25 and 26. The plastic material within the telescopic structure is maintained at the required temperature by means of the annular heater 37 and heat loss from the hydraulic cylinders is minimised by means of a lagging device 38 of helical formation disposed in the walls of the cylinders as shown.

FIGURES 5 and 6 show two alternative forms of nozzle either of which may be used in place of that incorporated in the arrangement shown in FIGURE 4.

By this invention there is provided an injection moulding machine or apparatus for the filling of a succession of moulds in which the only reciprocatory parts are of relatively light and consequently inexpensive construction, and the necessity of providing for the reciprocation of heavy machine parts is thereby avoided.

The invention is not restricted to the examples described, since details of construction of the injection or forcing head of the mould carrier structure may be widely varied. Thus the hydraulic cylinder may be substituted by a suitable form of bell-crank mechanism and the mould or mould carrier may be fixed as in a conventional injection moulding machine.

I claim:

1. In an injection moulding apparatus, stationary tubular means for supplying moulding material under pressure from a feed chamber, a telescopic structure including a chambered body disposed between said feed chamber and the mould and mounted to move axially on said tubular member, an injection nozzle forming part of said telescopic structure extending axially from said chambered body, means for moving said telescopic structure on said tubular member in one direction to bring said nozzle into engagement with a mould orifice and moving said telescopic structure in the other direction for withdrawing said nozzle from the mould, said nozzle telescoping into said structure upon further axial movement of said chambered body after engagement of the nozzle with said mould orifice has taken place, said nozzle including valve means for controlling the supply of moulding material to said nozzle, said valve means being automatically opened by said displacement action to permit the discharge of the moulding material through said nozzle.

2. In an injection moulding apparatus, a means to supply plastic material under pressure, a tubular supply conduit through which the plastic material is supplied, a chambered element mounted on said tubular element to slide axially thereon, a valved nozzle telescopically mounted in said chambered element movable parallel to the axis of said tubular element, means to move said chambered element toward a mould to be filled to press said nozzle against the mould and to move said chambered element and nozzle away from the mould after filling the mould, the area of said nozzle exposed toward said tubular conduit within said chambered element being greater than the area of said tubular conduit, whereby excessive pressure within said chamber acts to bias said chambered element toward said tubular supply conduit.

3. In an injection moulding apparatus stationary tubular means for supplying moulding material under pressure from a feed chamber, a telescopic structure including a chambered body disposed between said feed chamber and the mould and mounted to move axially on said tubular member, an injection nozzle forming part of said telescopic structure extending axially from said chambered body, means for moving said telescopic structure on said tubular member in one direction to bring said nozzle into engagement with a mould orifice and moving said telescopic structure in the other direction for withdrawing said nozzle from the mould said nozzle telescoping into said structure upon further axial movement of said chambered body after engagement of the nozzle with said mould orifice has taken place, said nozzle including valve means for controlling the supply of moulding material to said nozzle, said valve means being automatically opened by said displacement action to permit the discharge of the moulding material through said nozzle, said telescopic structure comprising a fixed tubular part secured to said feed chamber, a reciprocatory sleeve part slidable upon said fixed tubular part, and a nozzle part slidable within the outer end of said sleeve part, the bore of said nozzle part having a lateral inlet passage co-operatively arranged with respect to a counter bore in said sleeve part so as to act as a valve.

4. In an injection moulding apparatus stationary tubular means for supplying moulding material under pressure from a feed chamber, a telescopic structure including a chambered body disposed between said feed chamber and the mould and mounted to move axially on said tubular member, an injection nozzle forming part of said telescopic structure extending axially from said chambered body, means for moving said telescopic structure on said tubular member in one direction to bring said nozzle into engagement with a mould orifice and moving said telescopic structure in the other direction for withdrawing said nozzle from the mould said nozzle telescoping into said structure upon further axial movement of said chambered body after engagement of the nozzle with said mould orifice has taken place, said nozzle including valve means for controlling the supply of moulding material to said nozzle, said valve means being automatically opened by said displacement action to permit the discharge of the moulding material through said nozzle, said telescopic structure comprising a fixed tubular part secured to said feed chamber, a reciprocatory sleeve part slidable upon said fixed tubular part, and a nozzle part slidable within the outer end of said sleeve part, the bore of said nozzle part having a lateral inlet passage co-operatively arranged with respect to a counter bore in said sleeve part so as to act as a valve, said counter bore being formed in two parts having different diameters which close or open said inlet passages according to the position of said sleeve part, said sleeve part having a shoulder between the parts of different diameters, which co-operates with a flange on the inner end of said nozzle part when the sleeve part approaches the end of its stroke, so as to prevent the injection nozzle from being forced out of the sleeve part.

5. In an injection moulding apparatus stationary tubular means for supplying moulding material under pressure from a feed chamber, a telescopic structure including a chambered body disposed between said feed chamber and the mould and mounted to move axially on said tubular member, an injection nozzle forming part of said telescopic structure extending axially from said chambered body, means for moving said telescopic structure on said tubular member in one direction to bring said nozzle into engagement with a mould orifice and moving said telescopic structure in the other direction for withdrawing said nozzle from the mould said nozzle telescoping into said structure upon further axial movement of said chambered body after engagement of the nozzle with said mould orifice has taken place, said nozzle including valve means for controlling the supply of moulding material to said nozzle, said valve means being automatically opened by said displacement action to permit the discharge of the moulding material through said nozzle, said telescopic structure comprising a fixed tubular part secured to said feed chamber, a reciprocatory sleeve part slidable upon said fixed tubular part, and a nozzle part slidable within the outer end of said sleeve part, the bore of said nozzle part having a lateral inlet passage co-operatively arranged with respect to a counter bore in said sleeve part so as to act as a valve, said fixed tubular part providing a feed passage communicating at the forward end with the counter bore in said sleeve part, whereby moulding material supplied through said fixed tubular part is fed to said nozzle part when said inlet passages are opened by said reciprocatory part, means being provided for plugging the forward end of said fixed tubular part so as to render the apparatus suitable for effecting high pressure shot injection.

References Cited in the file of this patent

UNITED STATES PATENTS

| | | |
|---|---|---|
| 2,804,649 | Hupfield | Sept. 3, 1957 |
| 2,986,776 | Frohring | June 6, 1961 |

FOREIGN PATENTS

| | | |
|---|---|---|
| 1,172,986 | France | Oct. 20, 1958 |
| 1,217,152 | France | Dec. 7, 1959 |